United States Patent [19]
Geiger

[11] Patent Number: 5,916,464
[45] Date of Patent: Jun. 29, 1999

[54] WELDING FORCE FEEDBACK WIRE FEED SYSTEM

[76] Inventor: Michael B. Geiger, 1403 76th St., Houston, Tex. 77012

[21] Appl. No.: 08/922,839

[22] Filed: Aug. 26, 1997

[51] Int. Cl.⁶ ..................................................... B23K 9/133
[52] U.S. Cl. .................... 219/137.71; 219/72; 219/130.4
[58] Field of Search .......................... 219/137.71, 137.7, 219/130.4, 72, 137.2, 137.31

[56] References Cited

U.S. PATENT DOCUMENTS

| | | | |
|---|---|---|---|
| 3,632,950 | 1/1972 | Berghof | 219/72 |
| 3,892,937 | 7/1975 | Paton et al. | 219/72 |
| 4,139,758 | 2/1979 | Pinfold | 219/72 |
| 4,894,512 | 1/1990 | Heusi et al. | 219/130.4 |
| 5,302,805 | 4/1994 | Morris et al. | 219/137.71 |
| 5,736,711 | 4/1998 | Joos et al. | 219/72 |

Primary Examiner—Clifford C. Shaw
Attorney, Agent, or Firm—Kenneth A. Roddy

[57] ABSTRACT

A MIG and Flux Core wire feed and containment system for filler wire distribution for both manual and robotic underwater and terrestrial welding applications has a sensor feedback pressure sensor system that detects deflective and deformative pressures acting on the filler wire by surrounding environmental objects which the operator may not be aware of while setting up the task and which prevents the filler wire from being bent if the welding torch is inadvertently pressed against solid objects in robotic applications, thereby eliminating the need to manually straighten the wire, and enabling the capability of providing a filler wire distribution assembly at great water depths or at locations distant from the welding controls and in close proximity to the torch head.

19 Claims, 6 Drawing Sheets

WELDING FORCE FEEDBACK WIRE FEED SYSTEM

BACKGROUND OF THE INVENTION

1. Field of the Invention

This invention relates generally to terrestrial and underwater manual and robotic hyperbaric and unpressurized welding using wire fed torches such as MIG and Flux Core torches and associated wire feeder designs, and more particularly to a welding force feedback wire feed system for such applications that incorporates a sensor feedback pressure sensor which detects deflective and deformative pressures acting on the filler wire by surrounding environmental objects and prevents the filler wire from being bent if the torch is inadvertently pressed against solid objects.

2. Brief Description of the Prior Art

Heretofore, when underwater welding operations have been undertaken using divers completing manual tasks, shielded metal arc welding methods (SMAW) using stick electrodes, suitably waterproofed in solutions beforehand have been used. More recently, the introduction of Metal Inert Gas (MIG) and Flux Core wire fed torches has been undertaken with varying degrees of success employing divers for manual applications, and Remote Operated underwater Vehicles (ROV's) in robotic applications in progressively deeper and deeper water. The ability of these types of torches to automatically feed the filler wire and protect the weld pool with a flow of shielding inert gas is seen as a benefit in underwater welding operations. But the wire feed welding process suffers from several drawbacks due to the unpredictable and movable nature of the fluid medium composing the underwater environment and the inherent design of wire feed welding equipment.

In underwater manual and robotic MIG, Flux Core, and other types of wire fed welding operations such as plasma arc the requirement exists to provide a wire feed method at or near the diver or ROV because internal friction between the wire liner in the torch electrode lead and filler wire prevents the incorporation of long lengths of electrode lead, with filler wire bunching up at the drive rollers if lengths of electrode lead over 10 meters or so are incorporated. This limitation has prevented deeper underwater applications from evolving in the past because no underwater drive roller systems have evolved. The heretofore unmet need has existed for a submersible drive roller and filler wire storage system.

In addition, when divers are moving from one underwater location to another while holding the torch or while positioning themselves to begin a weld and their attention may be directed to other objects the torch is subject to unwanted contact with metal surfaces, and bending of the filler wire may result by forceful contact of the filler wire with a solid surface where it exits from the torch cup. The simple task of straightening a bent filler wire is complicated and prolonged by the unpredictable movements of the sea which tend to destabilize the diver and the fact that the diver is wearing electrically insulating gloves which are essential to the task and must be very carefully guarded if removed. The task may require valuable time while at depth under time constraints imposed by decompression schedules, and could prevent a diver from even beginning a weld if this problem takes place at an offshore location, such as an offshore oil platform where sea movements are a particular problem.

In addition, in robotic underwater applications where a robotic torch which is attached to an ROV is used for welding under adverse sea conditions the operator may not have time to move the torch away before a collision with a stationary object occurs, and may not be aware of a potential collision beforehand due to the restricted visibility of viewing through a TV camera lens. The requirement to bring an ROV up onto a support vessel to straighten a filler wire is seen as time consuming and labor intensive, making it unattractive. In nuclear power plant welding applications, the requirement to straighten the wire may not be easily achievable due to the presence of radiation in or on the ROV and welding components themselves.

For terrestrial robotic and manual applications the convenience of a bend resistant filler wire arrangement makes a torch incorporating this feature less fragile, requiring less care and attention to the way in which it is placed on a surface when set down in manual operations or when moving a robotic arm with a torch attached or incorporated. This makes it more economical to use, requiring less of the operator's time spent on wire straightening. It is seen as advantageous to be able to prevent a bent filler wire in a torch cup if uncontrolled contact occurs with a solid object by instantaneous retraction of the wire upon initial contact, thereby preventing it from bending.

In addition to the foregoing, there has been an unmet need to address a phenomenon known as "arc stray" in deeper underwater applications, and has also evidenced itself in hyperbaric, or high pressure underwater habitat welding, where the weld is completed in a dry environment in a gas or air filled structure surrounding the welding task at depth on the sea floor or on a submerged structure. Arc stray evidences itself as instabilities of the arc during the welding process, thereby preventing adequate control over the heating and metal deposition process. It is known that the addition of a high frequency signal to a DC power signal in these non-immersed, but pressurized underwater applications will help stabilize the arc, thus minimizing arc stray and improving weld penetration. However, no development or documented experimentation has been done to combine a submersible power supply, drive roller system and high frequency initiator for either wet or hyperbaric underwater welding applications. A novel system which combines high frequency arc stabilization with a submersible power unit and a submersible drive roller for MIG and Flux Core torch filler wire is hereby disclosed which improves the depth capabilities, quality and repeatability of high quality underwater welds.

In the prior art, there is little or no evidence of development of an underwater filler wire drive roller system, nor submersible welding power and high frequency systems for use with MIG or Flux Core torches.

Heusi et al, U.S. Pat. No. 4,894,512 discloses a submersible system for impressing a high frequency signal onto a welding power signal for manual diver operation wherein the welding machine is located above the water and is connected in series to an above-the-water control console which then supplies welding power to the submerged high frequency unit, thus making the welding generator structurally unsuited to be submerged. Heusi et al uses the term "immersible welding generator", suggesting either that the generator is to be immersed in the water, or that the generator is to be used in a dry environment to create power for "immersible welding". There is no teaching in the disclosure of waterproof enclosures or waterproof elements of the welding generator itself, however Heusi et al does teach a waterproof enclosure used to house the high frequency unit, leading the reader to conclude that the purpose of Heusi et al is to retain the welding machine at an above water location, rather than submergence of the welding generator for underwater welding.

In related underwater interventions this is acceptable because the depth requirements for deep diving applications is compatible with the physical and electrical constraints imposed on a welding system with comparable length leads. A diver who is doing a deep hyperbaric weld might need leads of up to 200 meters in length, which is technically feasible with the system taught by Heusi et al. Because the invention supplies direct current power to the torch, this length becomes critical for many recent deeper ROV related robotic welding requirements which have developed in the last 4 years. More than several offshore oil industry subsea completions which have had a requirement for underwater welding have been successfully completed in water depths exceeding 1200 meters in water depth with many more in the planning stages for depths exceeding 2000 meters. Because the structural design of Heusi et al is limited to shallower depths, it would not be suitable for use in robotic applications and ROVs or other robotic vehicles.

The employment and use of DC current as the primary power source from the surface to the subsea task also makes the system taught by Heusi et al unsuitable for use in deep robotic underwater welding due to the limits of direct current, which if used would dictate very large cable diameters to compensate for high resistance losses in long cable lengths. The use of 2 very large diameter cables, on the order of 5 cm each, makes this system functionally unfeasible for even the largest work class ROV to transport to an underwater location and remain stable at great depth. The weight alone of such large cables could not be compensated for by buoyancy packaging or wrapping without making each cable over 10 cm in diameter, which is impossible for current state of the art ROVs to handle in open ocean conditions in addition to the normal control umbilical for the vehicle. In addition, Heusi et al does not teach arc stabilization in hyperbaric, or "dry" underwater welding applications where the arc does not travel through a fluid medium. The fact that high frequency arc starters and stabilizers are only commonly used in industry for Tungsten Inert Gas welding (TIG) in terrestrial applications, which have a non-consumable electrode and are not wire fed, suggests that there is not a terrestrial or shallow water hyperbaric applications problem with arc stray in combination with wire fed torches. Heusi et al's system requires that the arc is to be constantly submerged in water during the entire weld, for which SMAW underwater electrodes are designed, but MIG torches and electrodes are not. Since MIG torches have a torch cup with a shielding gas flow around the filler wire which prevents the arc from coming in contact with sea water by constantly flooding the weld area with a gas, creating a miniature gas filled hyperbaric environment around the filler wire, arc and weld pool, the Heusi et al system would also be unsuitable for use with MIG torches.

The present invention provides a method of providing welding power at extreme water depths for robotic welding applications such as MIG and deep hyperbaric SMAW welds, without requiring large umbilicals and limits the extent of arc stray displayed during diver and ROV supported underwater MIG welds.

Niinivaara, U.S. Pat. No. 4,790,887 discloses an underwater additive for underwater arc welding which is smeared on an area to be welded prior to task initiation, but does suggest the use of underwater wire feeders or drive roller systems for MIG or Flux Core torches.

Stiles et al, U.S. Pat. No. 4,654,500 discloses the use of an underwater welding housing that has a TIG torch, which has a non-consumable electrode protruding through the side of the housing into the interior, and having a sponge rubber base for evacuating water from around a weld. Stiles et al teaches the use of a TIG torch with a non-consumable torch electrode as the preferred embodiment, but there is no suggestion of the use of wire fed torches nor associated wire feed roller systems.

Asonen, U.S. Pat. No. 4,527,046 discloses an electrode which is ignitable underwater that is placed adjacent a joint to be welded and covered with a burnable shield, but does not suggest the use of a filler wire with attendant drive roller systems for the weld.

Schloerb et al, U.S. Pat. No. 4,475,026 discloses an arc stud welding system for underwater use which welds a stud as the electrode onto a metallic substrate, but does not suggest the use a drive roll system for feeding filler wire into a weld.

Johnson et al, U.S. Pat. No. 4,361,746 discloses an underwater cutting and welding torch which is adapted for SMAW welding and underwater oxy-arc cutting, but does not employ or connect to any type of drive roll system.

Stingelin et al, U.S. Pat. No. 4,172,974 discloses an underwater welding chamber which has a vortex producing swirl chamber for spinning water, the centrifugal movement producing an air filled space in the interior of the chamber which is used for welding, and which uses MIG or TIG torches, but which does not suggest a drive roller system.

None of the foregoing patents and other known prior art teaches a submersible drive roller system for use in conjunction with a MIG or Flux Core torch, and there still exists an unmet need in this industry to enable this technology so that it can provide a robotic solution to needs which require a continuously fed wire at the weld, and to enhance the productivity of manual operations involving divers at shallower depths.

In addition, there is a growing need for an enclosure to enclose submerged elements for advanced welding systems such as laser emitters, microwave emitters, homopolar generators, storage capacitors, and plasma welding and thermal spraying powder feeders, particularly in deep robotic applications.

The present invention is distinguished over the prior art in general, and these patents in particular by a MIG and Flux Core wire feed and containment system for filler wire distribution for both manual and robotic underwater and terrestrial welding applications that has a sensor feedback pressure sensor system which detects deflective and deformative pressures acting on the filler wire by surrounding environmental objects that the operator may not be aware of and which prevents the filler wire from being bent if the welding torch is inadvertently pressed against solid objects in robotic applications, thereby eliminating the need to manually straighten the wire, and enabling the capability of providing a filler wire distribution assembly at great water depths or at locations distant from the welding controls and in close proximity to the torch head.

SUMMARY OF THE INVENTION

It is therefore an object of the present invention to provide a welding force feedback wire feed system which will operate in a multiplicity of submerged and ambient atmospheric conditions, and under conditions of extreme sedimentation, such as is found in salvage conditions in surf zones, where waterborne sand is constantly being swept into mechanical components of underwater tools or in extremely dusty terrestrial conditions where drive roller malfunction results from contaminants.

It is another object of this invention to provide a welding force feedback wire feed system which is immune to waterborne contaminants and can operate on an ROV or be used by a diver and is versatile enough to be used in either application.

Another object of this invention is to provide a welding force feedback wire feed system capable of enclosing an inverter, high frequency unit, and a step down transformer for deep water depths wherein high voltage alternating current for power transmission to an underwater vehicle and welding components is converted to usable current at depth rather than being transmitted as direct current from a remotely located generating source.

Another object of this invention is to provide a welding force feedback wire feed system capable of enclosing only the essential components required for a diver or a small easily transportable and deployable ROV to transport to and control at an underwater worksite using a direct current power supply from a nearby remotely located welding machine.

Another object of this invention is to provide a versatile, lightweight, welding force feedback wire feed system capable of use underwater with filler wire and power supply for MIG, Flux Core, and other types of wire fed types of torches such Plasma Arc at or near the welding task.

Another object of this invention is to provide a welding force feedback wire feed system which has an underwater drive roller and feed wire delivery system that is immune to waterborne particulate induced congestion and jamming of its movable mechanical components.

Another object of this invention is to provide a welding force feedback wire feed system having a pressurized, mobile feed wire system and a relatively short electrode/filler wire lead which a diver or an ROV may easily transport to an underwater work site.

A further object of this invention is to provide an underwater welding force feedback wire feed system which supplies a high frequency signal component on the power signal for underwater MIG, Flux Core, and other types of wire fed welds, including underwater hyperbaric welds.

A still further object of this invention is to provide a welding force feedback wire feed system which is inexpensive to manufacture, and rugged and reliable in operation.

Other objects of the invention will become apparent from time to time throughout the specification and claims as hereinafter related.

The above noted objects and other objects of the invention are accomplished by the present MIG and Flux Core wire feed and containment system for filler wire distribution for both manual and robotic underwater and terrestrial welding applications that has a sensor feedback pressure sensor system which detects deflective and deformative pressures acting on the filler wire by surrounding environmental objects and which prevents the filler wire from being bent if the welding torch is inadvertently pressed against solid objects in robotic applications, thereby eliminating the need to manually straighten the wire, and enabling the capability of providing a filler wire distribution assembly at great water depths or at locations distant from the welding controls and in close proximity to the torch head.

DESCRIPTION OF THE PREFERRED EMBODIMENTS

Figure 1A:
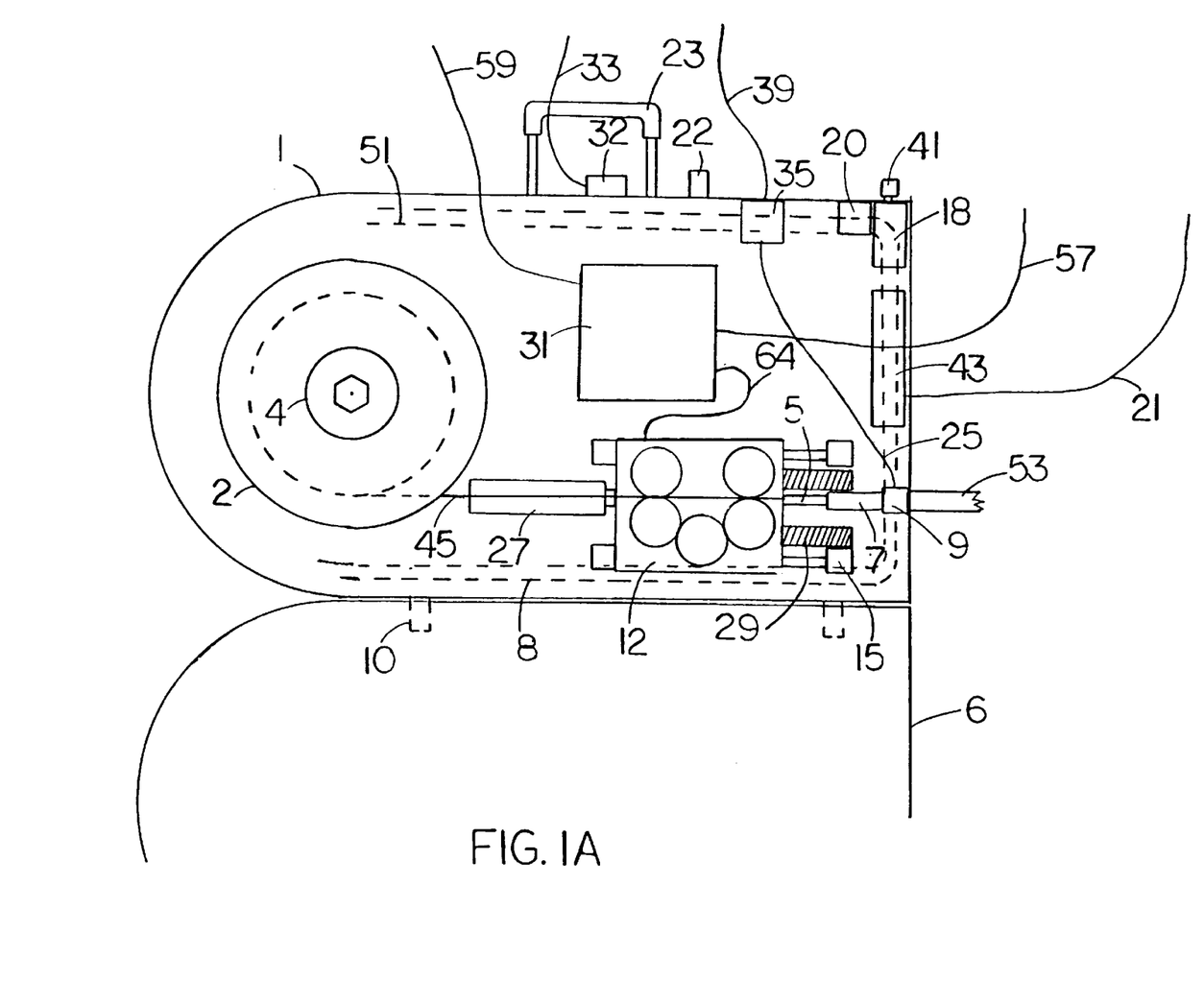
FIG. 1A is a side elevation view of an underwater wire feed enclosure and its attachment to an underwater MIG torch in accordance with a preferred embodiment of the invention for use by divers engaged in manual underwater welding operations, shown with the cover open.

Referring to the drawings by numerals of reference, there is shown in FIG. 1A, a preferred embodiment of the present invention adapted for use by a diver for manual underwater welding operations. There is shown in side elevation, an enclosure 1, with the cover 6 open, having a handle 23 attached to the enclosure. In the preferred embodiment the enclosure is made from high density polyethylene, although in alternate embodiments may be made from carbon fiber composite, fiberglass, other plastics such as Kevlar or Lexan polycarbonate, brass, stainless steel, titanium, aluminum or other rigid, strong materials as may be suitable, and may have portions made from materials with high thermal transmission capabilities such as metals, which may be employed as heat sinks to facilitate cooling of the internal heat producing components. If electrically conductive materials are used for this purpose, all attached internal components must be isolated using suitable electrical insulating materials to prevent grounding and electrical shocks to the diver.

An air supply hose 33 is connected to the exterior of the enclosure and to an air pressure regulator 32 which is an ordinary single hose SCUBA regulator with an adjustable second stage, of the type commonly used for recreational diving, that is mounted on the side of the enclosure with its air delivery orifice penetrating the enclosure wall. The regulator 32 senses increased water pressure and maintains a preset pressure internally with respect to outside pressure, and overpressure is regulated by an overpressure relief valve 22, which is a preloaded exhaust valve with a 1 kg internal spring to maintain suitable overpressure as the enclosure is operated at depth and as it vents as it encounters reduced sea pressure in returning to the surface. This internal pressure differential may be either reduced or increased as desired by changing spring pressures in the overpressure relief valve. Suitable valves for this application are commercially available from Circle Seal Inc., Anaheim, Calif. A wire reel 2, which is prevented from unrolling its wire by means of a tensioner 4 located at the side of the center of the wire reel. The tensioner 4 is a helical spring with a ratchet assembly preset to ratchet at 1 kg of pressure as the reel feeds the wire, and which has a pin which fits into a provided hole in the side of the reel, thereby keeping constant tension on the wire as it is either retracted or advanced in the welding process. The wire reel distributes a filler wire 45 to a roller assembly 12, which is a 24 volt DC powered four drive roll feeder common in the art and which is mounted on a linear slide 15. The filler wire then enters an inner sleeve 5 fixedly attached to the roller assembly and which slides in and out of an outer sleeve 7, which is fixedly attached to the enclosure, and both of which are preferably made from bronze, although any durable, non-galling material such as titanium or high density polyethylene may be used. These elements must be isolated from transmitting electrical current from the roller assembly to other surfaces by suitable rubber or other insulative materials as are commonly used in the art if the materials selected for their construction are electrically conductive.

A DC input cable 57, which receives DC welding current from a remotely located welding source, the circuit of which penetrates the enclosure using a common underwater connector, is connected to a high frequency multiplexer unit 31, that multiplexes a 1–2 megahertz high frequency signal onto the DC power signal, then sends the composite signal to the filler wire by an HF output cable 64. The larger high frequency units may have an integral fan in the shroud as supplied from the factory. The fan may be removed with the shroud to minimize weight and overall package size, in which case, an alternate cooling method must be used such as the incorporation of a heat sink into the enclosure body or other suitable cooling method. The requirement for this is driven by the duty requirements of the specific welding task, which directly influence the amount of heat produced inside the enclosure by the components.

Figure 1B:
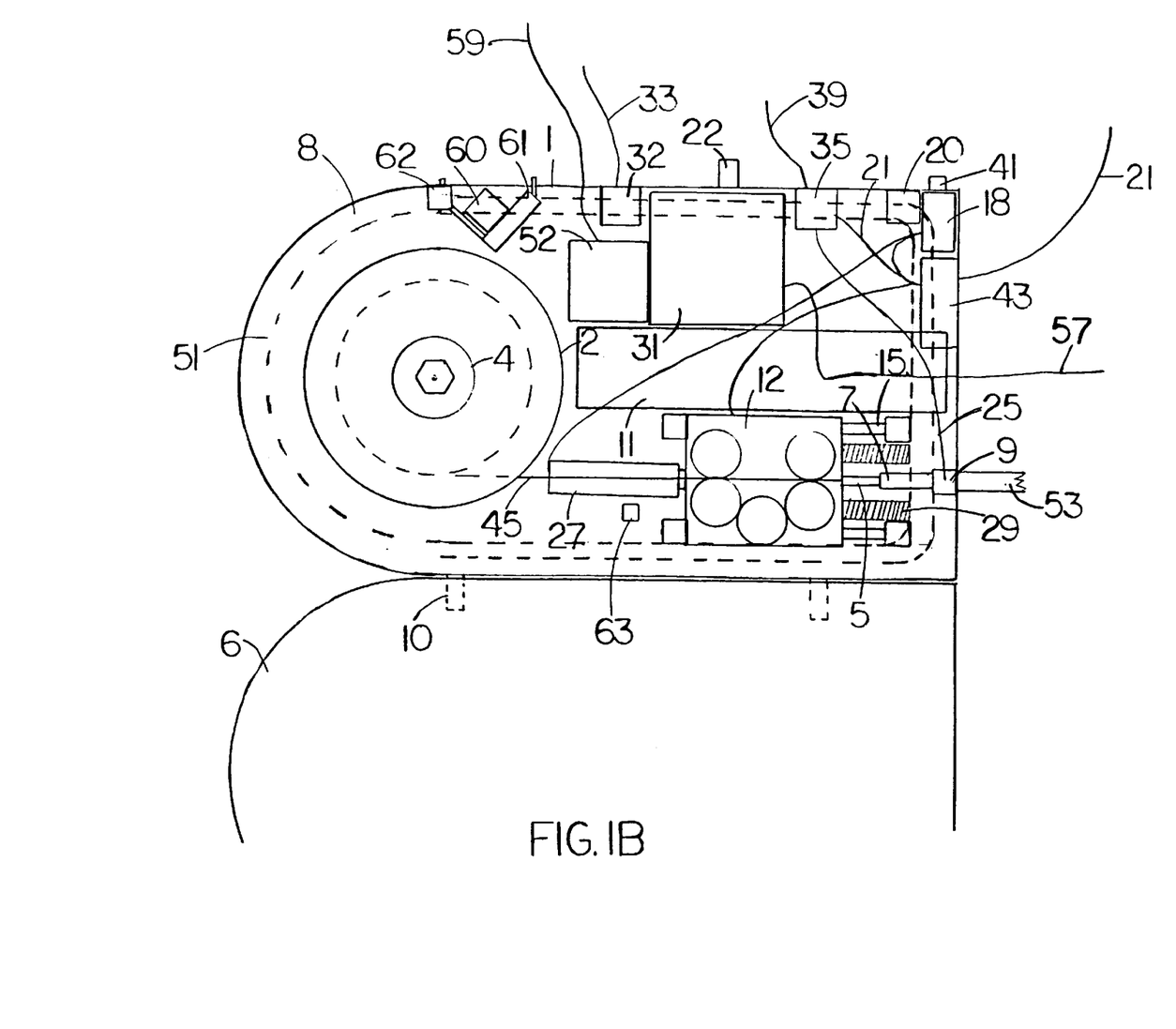
FIG. 1B is a side elevation view of a second embodiment of the present invention for use with an ROV, shown with the cover open.

A fan 60, heat exchanger 61, and water pump 62 as shown in FIG. 1B may be used in prolonged very high duty requirements if low thermally conductive materials for the enclosure are chosen and no heat sink is provided for the high frequency unit to dissipate heat. An AC input cable 59 is also connected to the high frequency multiplexer unit 31, which provides 115 VAC power to the high frequency unit from a remotely located alternating current source. It is recommended for safety that a ground fault interrupt circuit breaker be installed at a remote location in the AC transmission line to prevent alternating current shocks to the diver if a short circuit occurs and to prevent underwater electrical component breakdown. The high frequency unit 31 and the AC input cable 59 may be eliminated in alternate embodiments with the DC input cable terminating at the roller assembly as is common in the art, which will allow a smaller enclosure size, similar in shape to that shown in FIG. 1C. The pressurized atmosphere inside the enclosure at the exit point of the filler wire from the enclosure is maintained by means of an O-ring gland 9, which preferably has two O-rings in separate grooves, but may alternatively have one or more O-rings in grooves or other seal arrangements to seal the filler wire as it exits the enclosure, and is made from similar materials as the enclosure with provisions for electrical isolation from internal power to prevent short circuits to the surrounding sea water. An adjustable relay 18 is positioned adjacent an amplifier 20 which amplifies signals sent from a remotely located load cell on a torch, then sends them to the adjustable relay which in turn sends a signal that actuates a solenoid 27 thereby changing the position of the roller assembly. The adjustable relay is a 28 volt DC solid state voltage sensor with a fixed pick up and an adjustable drop out with an exposed adjustment knob 41 the stem of which penetrates the enclosure through an O-ring gland and which the diver has access to while underwater. Suitable adjustable relays are commercially available from Siemens Electromechanical Components, Inc., Princeton, Ind. When the solenoid is retracted, the roller assembly returns to its previous position, and in a preferred embodiment, may be assisted by a coil spring 29. In other embodiments, the coil spring may be eliminated or replaced by another type of spring or loading device such as a pneumatic shock absorber, solenoid and lever, bungi cord, or rubber band.

Shielding gas for the torch is fed into an electrode lead 53 at the O-ring gland on the torch side of the O-rings by a hose 25 which is attached to a flow meter 35 that is fed a supply of shielding gas by a shielding gas supply hose 39 from a remotely located source. The electrode lead 53 is a common MIG or Flux Core hollow torch lead with hollow provision internally for filler wire and shielding gas transmission to a torch. The flow meter 35 is fixedly attached to the interior of the enclosure and is adjustable by the diver using a knob which penetrates the enclosure through an O-ring gland. The flow meter 35 is a miniaturized gas flow meter for welding applications, common in the industry. In alternate embodiments an electrically controlled flow meter may be installed with a signal transmission wire connecting it to a remotely located control console for remote control of the shielding gas supply flow rates if so desired. An analog to digital converter 43 provides control and sensing signals for topside personnel through a signal transmission wire 21 to monitor, control and manipulate all functions of the system such as but not limited to wire feed speed, arc voltage, amperage, high frequency parameters, system resistance, duty cycle, amount of wire left on the reel, and shielding gas flow rates. An inductive or other type of proximity or other type of sensor or mechanical detector may also be incorporated into the enclosure to monitor the amount of filler wire left on the reel, and can have a remote readout if so desired.

The enclosure 1 is sealed on the side by a cover 6, which is preferably made from 1 cm thick high density polyethylene, but may be constructed from other similar materials as described above, and is attached to the enclosure by a hinge 10, of which there may be a multiplicity, and seals against an O-ring 8 in a provided groove on a lip 51 around the periphery of the enclosure, both of which have been removed to enable a clearer view of the internal components and shown by dotted lines. The cover 6 is preferably secured to the enclosure 1 by bolts, but may also be secured by various other conventional clips and fasteners, and may have the hinges deleted if so desired.

FIG. 1B shows a side view of an alternate embodiment of the present invention which is particularly adapted for use with an ROV in robotic applications, and which will also work acceptably for manual operation by a diver. The enclosure 1, shown with the cover 6 open, has a lip 51 around its inner periphery, with an O-ring in a groove which provides the sealing surface for the cover 6 to seal against when closed. The drawing has the lip of the enclosure removed to allow clearer viewing of the internal components, and the O-ring and the inner dimension of the lip is shown by dotted lines. Many of the components and functions shown in this embodiment are designed to be remotely sensed and controlled by a remotely located operator at a console who also controls the operation of the enclosure and ROV if used in robotic applications, or for manual operation during conditions of extreme turbulence which makes changing settings difficult for the diver. In this embodiment the tensioner 4 for the filler wire reel is located at the side of the center of the reel and is of the helical spring-ratchet type with a release pressure of 1 kg which remains constant as the reel turns in operation, similar to that shown in FIG. 1A. A shielding gas supply hose 39, shown at the top of the enclosure 1, supplies gas to a flow meter 35, which is a miniaturized, electrically controlled flow metering device, controlled by signals passed by a signal transmission wire 21 that connects to an analog to digital converter 43 which sends sensing signals and receives control signals through another signal transmission wire outside of the enclosure that terminates at a remotely located control console. The shielding gas is delivered to the O-ring gland by a hose 25 on the torch side of the O-rings, where it enters the common interior space of the electrode lead with the filler wire being expelled at the torch. In all embodiments described herein the O-ring gland is electrically insulated to prevent short circuits from either the filler wire or other electrically conductive internal components to either the diver or to the surrounding sea water, or other structures. A filler wire 45 located at the back of the roller assembly penetrates both sets of drive rollers and enters, at the front of the roller assembly, an inner sleeve 5 that is fixedly attached to the roller assembly and which slides in and out of an outer sleeve 7 in a design similar to that shown in FIG. 1A. An adjustment knob 41 is provided at the outside of the enclosure to manually adjust the adjustable relay if so desired, and the relay may also be controlled remotely and is connected to the analog to digital converter by a signal transmission wire for such control. A solenoid 27 at the rear of the roller assembly is actuated by the adjustable relay, which in this embodiment may be remotely controlled by signal control circuitry and by relocating the adjustment knob at a remotely located console. The solenoid used in this application is an industrial automotive type used with 24 volt DC starter motor systems, although other types may be used. In this embodiment, two springs are shown at the front of the roller assembly, the positions of which with the solenoid may be reversed with respect to one another, the springs being relocated at the rear of the rollers and the solenoid at the front if so desired, and more springs may be used if so desired, or replaced by solenoids at both the front and back. The solenoid is controlled by a signal initiated by the adjustable relay but the drop out voltage level is controlled by a signal sent from a remotely located console connected to the adjustable relay by the analog to digital converter and signal transmission wires.

An AC input cable 59, shown at the top of the drawing, penetrates the wall of the enclosure and connects to a step down transformer 52, which preferably drops the input voltage for welding from 440 VAC to 120 VAC, then passes the current to an inverter 11 that inverts the current to DC current, although other alternating current voltages may be used. Many of the larger inverters are capable of directly converting 440 VAC to usable welding current without requiring a separate step down transformer, and the step down transformer for the welding current can be eliminated from the system in such cases. Connected in series to the inverter and also receiving 120 VAC current from an AC output jack on the inverter, if so desired, is a high frequency multiplexer unit 31 which multiplexes a 1–2 megahertz signal onto the power signal, then supplies the combined power signal to the filler wire. Suitable inverters and high frequency units for this purpose are commercially available from Miller Electric Co. Advanced Products, Appleton, Wis. In this embodiment the shrouds covering the high frequency unit, inverter and step down transformer, if used, are removed and the cooling fans are replaced by a fan 60, which blows air through a heat exchanger 61 and a water pump 62 which pumps a continuous flow of water through the heat exchanger to facilitate a circulating cooling flow of air of the internal components during operation. A flow of chilled water from a remotely located chiller may also be employed to further cool the circulating air or to directly cool the elements, if desired, by locating copper tubing with chilled water flowing therethrough in intimate proximity to the specific elements. A temperature sensor 63 senses the air temperature inside the enclosure with a constant readout at the remotely located console. Other sensors may be installed to sense other parameters such as air pressure inside the enclosure, circuit resistance, and magnetic field strength in the weld area.

In other alternate embodiments of the present invention, the enclosure 1 containing a reel of filler wire, an inverter and a high frequency multiplexer unit or any combination of thereof, and without an enclosed roller assembly, may be connected to an electrode lead which is connected to a welding gun having rollers similar to a Miller XRM-30W feeder gun that draws filler wire from the enclosure of the present invention through a relatively short length of electrode cable. In another similar alternate embodiments, a welding gun having drive rollers and a small spool of filler wire, similar to the Miller Electric Co., Spoolmatic Model 30A feeder gun, may be connected to an electrode lead which is connected to an enclosure of the present invention containing an inverter, a high frequency multiplexer unit or both and without a reel of filler wire enclosed in the enclosure. The enclosing of inverters or other welding power generating sources such as conventional welding generators and high frequency units in underwater enclosures and either or both being used in combination with a wire fed torch is one of the objectives of the present invention.

In another alternate embodiment, the enclosure 1 may have enclosed dual drive roller assemblies, which have been modified to simultaneously deliver filler wire supplies to two torches, the nozzles of which are enclosed in common in, as disclosed in my U.S. Patent No. pending, entitled "Torch Mounted Gas Scavenging system For Manual And Robotic Welding And Cutting Torches", which is hereby incorporated herein by reference. Both of the drive roller assembly motors may be connected in a parallel electrical circuit which simultaneously initiates both rollers to feed wire to the torches, or alternatively both drive roller assemblies may be connected to a common drive motor by an angle drive gear box with dual output shafts which is controlled by remotely located signal initiation means and connected by signal transmission wires. In another alternate embodiment, the enclosure of the present invention may contain multiple inverters or other types of power generating means for welding along with multiple high frequency multiplexer units. In another alternate embodiment the present invention may have multiple torch and ground leads extending from and to the enclosure.

Figure 1C:
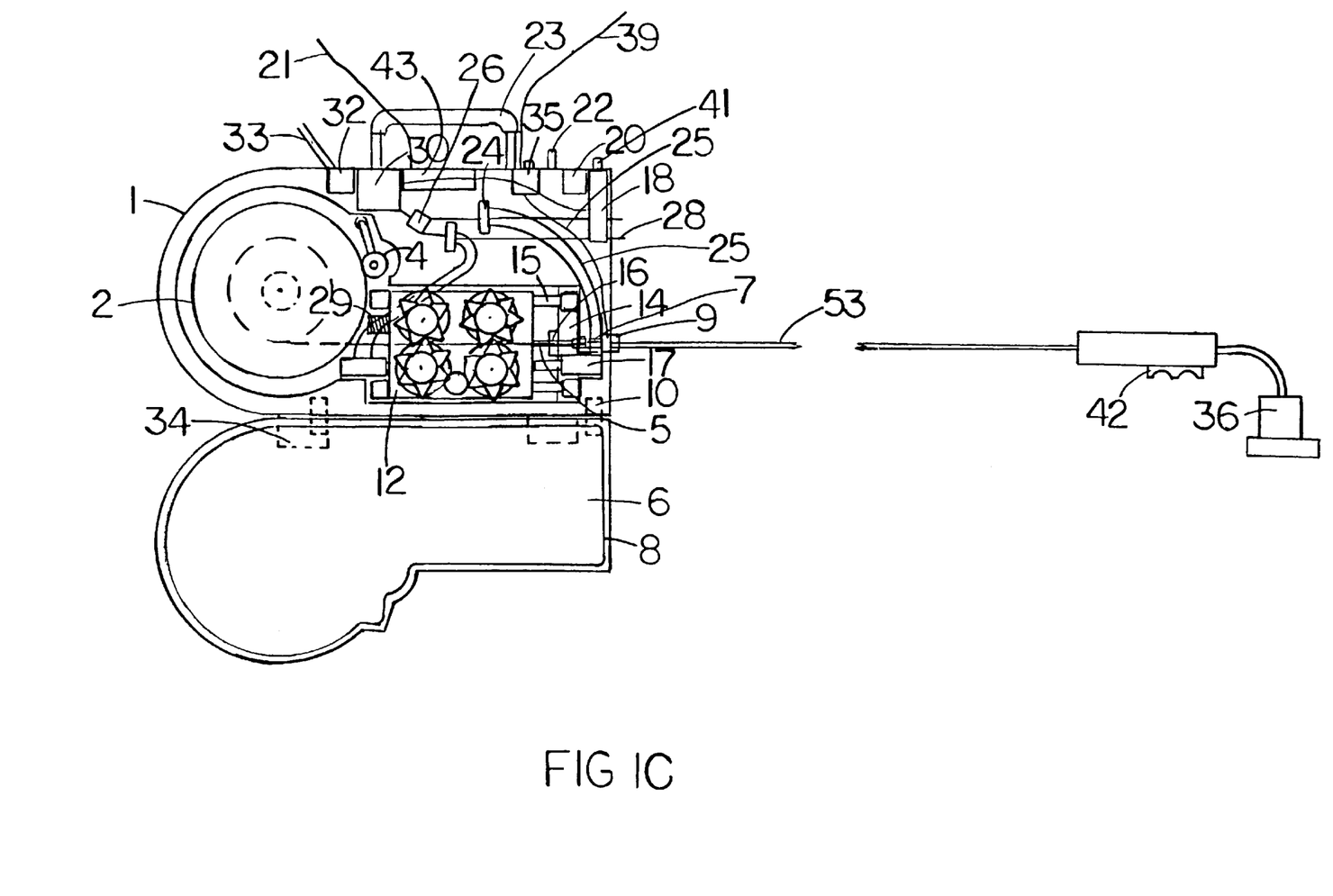
FIG. 1C is a side elevation view of a third embodiment of the present invention, shown with the cover open and depicting an alternate method of moving the roller assembly and sensing forces acting on the filler wire.

Referring now to FIG. 1C, there is shown, in side view, an embodiment of the enclosure 1 of the present invention which is very small and lightweight and can easily be transported to an underwater task by a diver or a small ROV with limited payload capabilities, The enclosure 1, is shown attached to an electrode lead with a MIG torch connected thereto, and the cover 6 of the enclosure 1 is open. A shuttle valve 24, of which there may be a multiplicity, is disposed in the interior of the enclosure 1, each of which has a three-position open center slide valve controlled by a solenoid, but alternatively, may be controlled by a servo motor or mechanical means such as by levers or motors, and a flow divider 26, which is connected to a pump 30. The preferred pump 30 is a conventional low pressure centrifugal pump for pumping saltwater and is electrically powered by direct current power, but may alternatively be pneumatic, hydraulic, or AC powered. The tensioner 4 in this embodiment is a spring loaded arm with a DC servo motor attached to a rubber wheel which presses against the edge of the wire reel and which exerts a constant 1 kg of turning force against the movement of the reel. The linear slide is mounted at the anterior portion on a linear slide mounting plate 14 which is shock mounted by rubber mounts at each end to the enclosure, and which bears against a load cell 16 which is mounted independently of the linear slide mounting plate and secured to the enclosure to sense loads imposed by the filler wire as its end is pressed against by a foreign solid object, and thus transfers the pressure from the wire to the drive roller, then to the linear slide and the linear slide mounting plate, which then bears against the load cell. An exhaust duct 28 vents the pumped water outside the enclosure unless the shuttle valve positions are changed to block and divert the flow to a ram 17, of which there may be a multiplicity, through a hose 25 of which there also may be a multiplicity. When a trigger switch 42 on the handle of a wire fed torch is depressed, the torch of which may have a torch enclosure 36 attached, a signal is sent to the adjustable relay which in turn sends a signal to the amplifier, then to the shuttle valve solenoid to reverse the position of the shuttle valves, and hence the rams, thereby acting to advance the roller assembly and filler wire to enable the welding operation. The enclosure is sealed on the side by the cover 6, which preferably is made from 1 cm thick high density polyethylene, but may be constructed from other similar materials as discussed above. The cover 6 is attached to the enclosure 1 by a hinge 10, of which there may be a multiplicity, and has around its periphery an O-ring 8. The enclosure 1 may have as its attachment means a magnet 34, of which there may be a multiplicity, or various other attachment means conventional in the art.

Figure 1D:
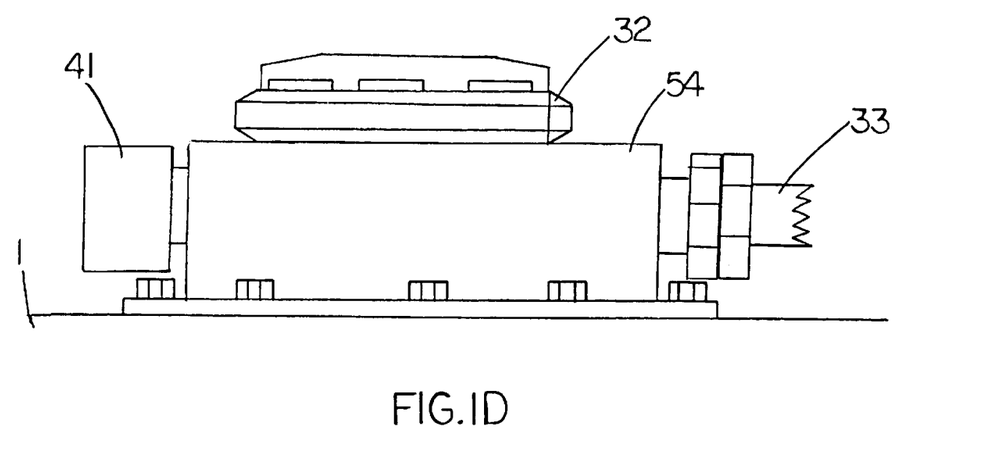
FIG. 1D is a side elevation view of the air pressure regulator used in the present invention, showing the mounting arrangement on the enclosure.

Turning now to FIG. 1D, there is shown in side view, the mounting arrangement of the air pressure regulator. A regulator mount 54 is secured to the enclosure and is sealingly attached to an air pressure regulator 32 which has an air passage through which a volume of air can be introduced into the interior of the enclosure in response to increasing pressure outside of the enclosure. An adjustment knob 41 penetrates the side of the regulator mount and can be manually adjusted to suit varying requirements for increasing or decreasing the internal pressure differential, and air is supplied to the regulator through an air supply hose 33. The regulator mount may be a protuberance integral with the body of the enclosure, shaped to seal against the regulator body, or may be made from a compatible metal such as bronze and welded or brazed to the body of the regulator to achieve sealing integrity and the finished assembly being bolted to the enclosure body itself. In the preferred embodiment the regulator mount is bronze and welded to the body of the regulator and is sealed to the enclosure by bolted connections.

Figure 2:
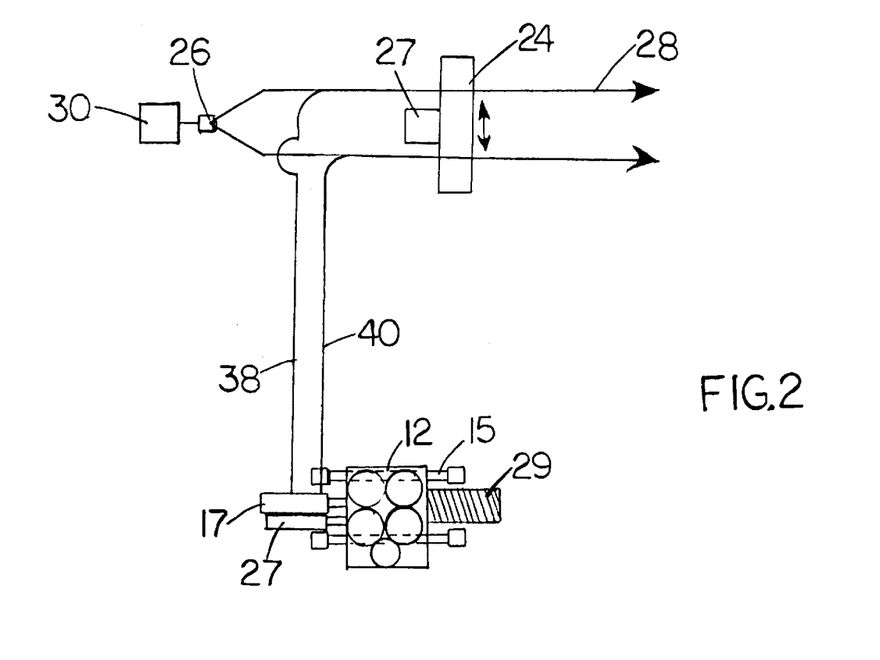
FIG. 2 is a schematic representation of the fluid circuit used in an alternate embodiment of the present invention to move the drive roller assembly.

Turning now to FIG. 2, there is shown a schematic view of an alternate embodiment of the fluid circuit used to control the movement of the roller assembly on the linear slide depicted in FIG. 1C. A solenoid 27 is attached to a shuttle valve with dual open centers to allow two flows to pass through when in the center position. When this position is changed, one flow or the other is blocked, depending upon whether the movement is upwards or downwards. An extend hose 38 and a retract hose 40 allow water to flow to either side of the piston in the ram, which is a double acting low pressure ram. In this embodiment the ram and a spring moves the roller assembly back and forth to the operating position in response to load cell initiated amplified signals from the adjustable relay. The spring is shown in front of the roller assembly, and acts to retract it in response to a retraction of the piston in the ram, although the relative positions of the ram and spring may be reversed, thereby using the ram as the prime mover for retraction movements if so desired. A solenoid may be positioned on one side of the roller assembly to either assist or replace the ram if so desired, and is connected to the adjustable relay and amplifier by suitable circuitry conventional in the art.

Figure 3A:
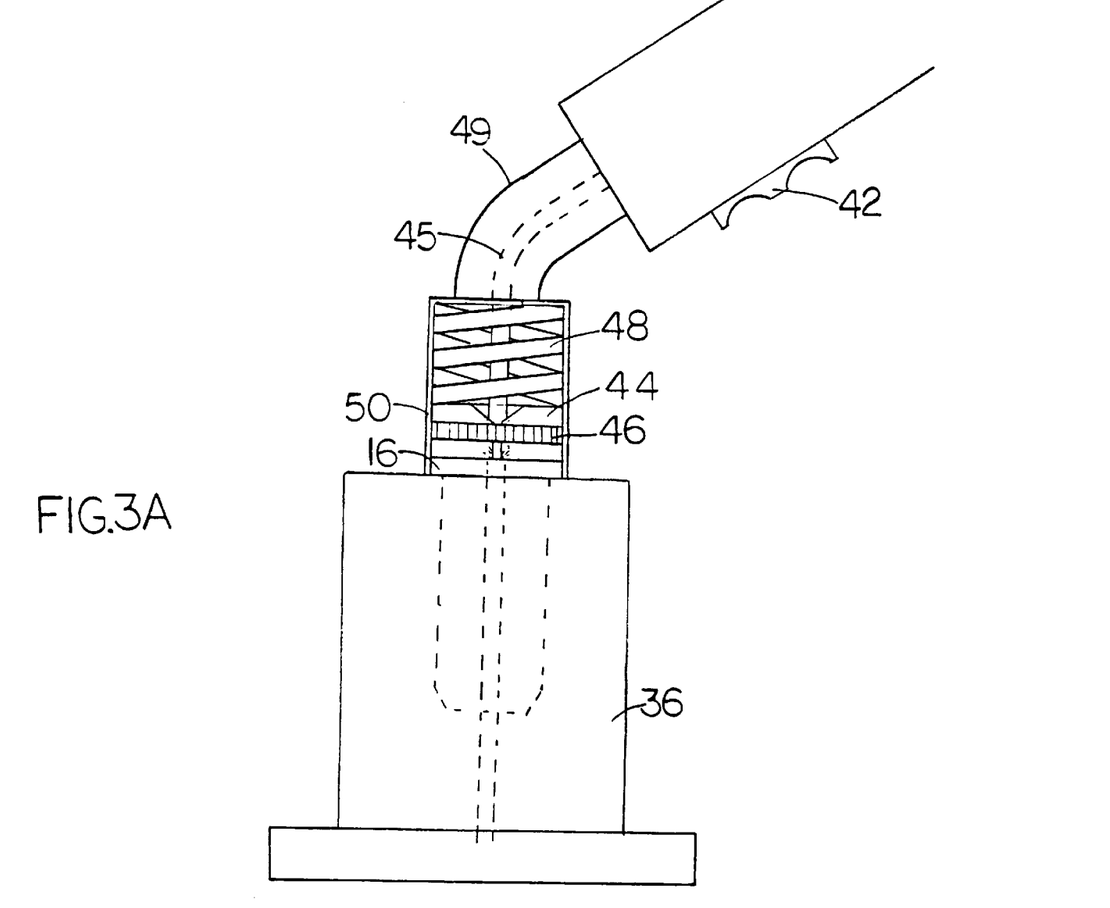
FIG. 3A is a side cross sectional view of the force feedback sensor used in the preferred embodiment of the present invention, showing the internal components.

FIG. 3A shows in a side cross sectional view, a MIG torch attached to a torch enclosure that encloses the conductor tip, nozzle and torch cup in a gas filled cavity and acts as a miniature hyperbaric chamber. A similar structure is disclosed in my U.S Patent No. pending, entitled "Torch Mounted Gas Scavenging System For Manual And Robotic Welding And Cutting Torches", which is hereby incorporated herein by reference. The torch enclosure has at its top a load cell enclosed in a collet enclosure 50, with an internal spring 48. The collet enclosure 50 is preferably attached to a conductor tube 49 of the torch, by means of threaded connections, although screws, bolts, adhesives, clips or clamps may be used to join the two elements. Inside the collet enclosure is disposed a filler wire 45, which penetrates each of the elements and exits the torch at the torch cup as is typical in Flux Core and MIG torches, and surrounding the filler wire is a collet 44, having multiple elements that are held together by a circular spring clip 46 which applies equal pressure to the elements of the collet to maintain them in intimate proximity with one another and with the filler wire inside the collet enclosure. The collet 44 is free to slide up and down in the collet enclosure and bears directly upon a load cell immediately beneath it. The load cell has a preset load applied by the spring, the pressure of which drops or disappears when the collet is moved upwards slightly by the application of pressure to the end of the filler wire, which acts to lift the collet off the load cell by the slight reverse movement of the filler wire. The adjustable relay is triggered to release a signal to the solenoid at a preset value, thereby retracting the roller assembly by moving the shuttle valve. Suitable miniaturized load cells for this application may be adapted by drilling a central aperture of appropriate size to allow the filler wire to pass through without binding, and to allow suitable gas flows to pass through. This operation may need to be completed at the load cell manufacturer, and suitable load cells modified for this application are commercially available from Cooper Instruments & Systems, Warrenton, Va. The trigger 42 and associated circuitry on the torch is preferably 24 volt DC current, although either direct current or alternating current may be used.

Figure 3B:
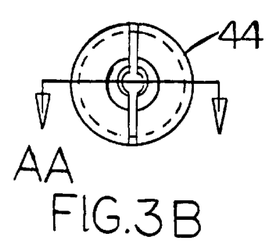
FIG. 3B is a plan view of the collet used in the sensor element, showing the central aperture and longitudinal cut.

FIG. 3B, shows the collet 44 of FIG. 3A in plan view. In the illustrated example, the collet 44 is formed of two lateral segments, although the collet may be formed with more or less than two segments, and other collet configurations may be used such as a single element with cuts partially extending along the length of the element, allowing the interior portions of the collet to bear upon the filler wire when so desired.

Figure 3C:
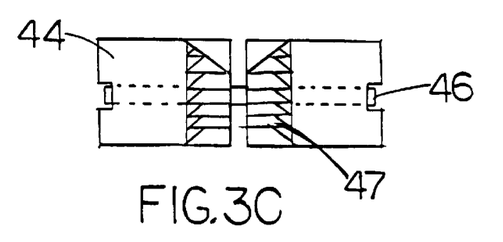
FIG. 3C is a cross sectional view taken along lines AA of FIG. 3B showing a detailed arrangement of the teeth and the circular spring.

FIG. 3C shows the collet 44 in longitudinal cross section and the arrangement of multiple collet teeth 47, of which there may be a multiplicity, that are disposed in the interior of a central aperture in the collet. The elements of the collet 44 are flexibly held intimately together by the spring clip, which is a convoluted circular spring that pressure presses inwardly against the elements of the collet, thus pressing each element against the filler wire. The collet is made of titanium in the preferred embodiment, although it may be made from any suitable heat and abrasion resistant metal such as bronze or carbide.

Figure 4A:
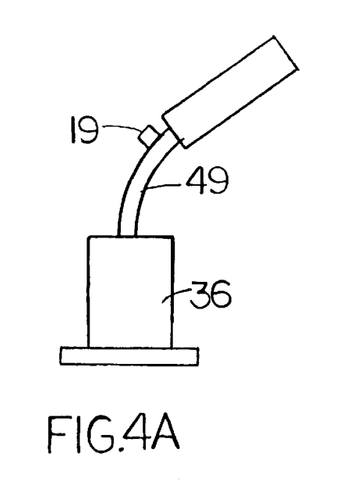
FIG. 4A is a side elevation view of an alternate embodiment of the present invention, showing a load cell in an enclosure attached to the conductor tube of a torch.
Figure 4B:
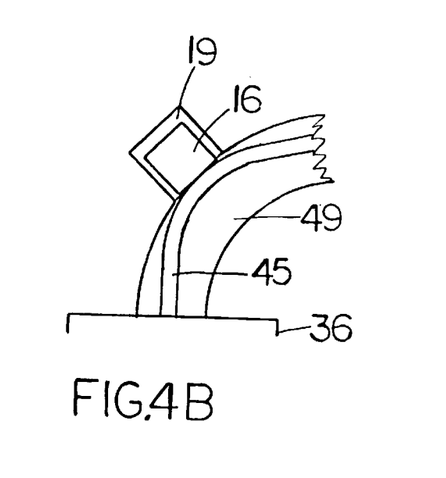
FIG. 4B is a side cross sectional view of the conductor tube FIG. 4A, showing the deflection of the filler wire into the load cell when impinged upon or pressed on, at, or near its end.

FIG. 4A is a side view of an alternate embodiment of the sensor arrangement on a torch where a load cell mount 19, which is made from hard copper and contains a miniaturized load cell, is attached to a conductor tube on a torch which may have an enclosure attached if so desired. FIG. 4B shows a detailed view of the sensor arrangement of FIG. 4A, illustrating the deflection of the filler wire into the load cell when impinged upon or pressed on at or near its end. In this embodiment, the filler wire contacts the load cell when deformed upwards resulting from applied pressure, initiating a signal in the load cell which causes the roller assembly to retract.

Figure 5:
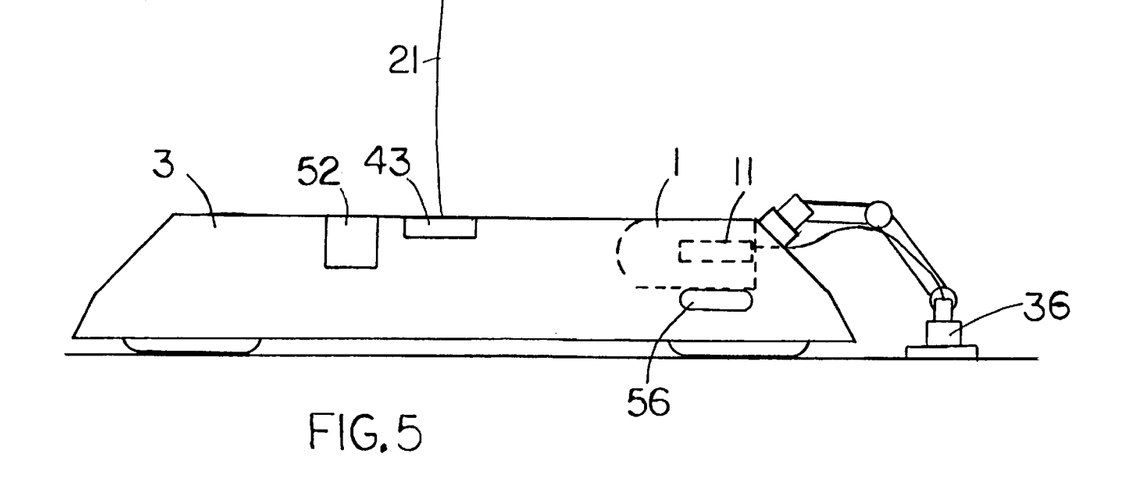
FIG. 5 is a side elevation view of a surface adhering ROV with a robotic arm equipped with the welding force feedback wire feed system in accordance with the present invention which is shown welding while attached to a structure.

FIG. 5 is a side view of an ROV, or Remote Operated underwater Vehicle 3, which in the illustrated example is a surface adhering ROV with a robotic arm equipped with the welding force feedback wire feed system in accordance with the present invention. However, the present welding force feedback wire feed system may be used on any type of ROV, including non-surface adhering and exclusively mid water operating ROV's. The robotic arm of the ROV 3 has a torch attached and enclosed by a torch enclosure 36. In the illustrated example, the welding force feedback wire feed system is incorporated into the body of the ROV, although the present invention may be attached to the outside of the vehicle, using suitable fastenings such as J-bolts, toggle bolts, bungi cords, magnets, adhesives, welding, clips or other conventional fasteners known in the art. The present invention may also be incorporated into or affixed to other types of robotic vehicles for terrestrial applications, which can be magnetically or otherwise attached to a structure in an atmospheric environment. When operated on an ROV, the welding force feedback wire feed system may be used for deeper applications below 500 meters in depths which may otherwise make the transmission of direct current power from the operations platform unfeasible due to cable size restrictions. In this embodiment the inverter shares a common enclosure with the roller assembly and the high frequency unit, and the umbilical supplying power to the ROV has 440 VAC power which is stepped down to 115 VAC by a step down transformer 52 then inverted to suitable DC current by an inverter 11, and the DC signal is then fed to a high frequency multiplexer unit which multiplexes a 1–2 megahertz signal onto the DC power signal before supplying the combined signal to the filler wire. The high frequency unit has an adjustment for voltage as an adjustable parameter. Inverter power, voltage adjustments, high frequency adjustments and other controlling and sensing functions as are desired are remotely controlled by signal transmission wires linking the inverter and high frequency controls, which are relocated to a remotely located control console that is connected to an analog to digital converter in the dry enclosure which contains the inverter and other power and electrical components. A high pressure air cylinder 56 may be provided onboard the ROV to supply pressurized gas to the interior of the enclosure via a hose to supplant or augment the supply through the air supply hose 33 if so desired. Suitable lightweight high pressure cylinders made from Dupont Kevlar (TM) composite are commercially available which have operating pressures on the order of 4400 psi, and are approximately 40% lighter in weight than their aluminum counterparts, making them preferable for use in this application.

OPERATION

In operation by a diver in wet welding or hyperbaric applications, the enclosure 1 is loaded with appropriate filler wire on the reel, the cover 6 is closed and bolted shut, the air supply hose and shielding gas supply hose is pressurized, and the system is deployed. The magnetic fasteners are used for securement to a structure and may be assisted by lines, cords or other means to maintain positional stability of the enclosure and torch while at the task site. As the torch is deployed, if the filler wire makes inadvertent contact with the submerged structure, the wire is automatically retracted, thereby preventing its bending, and the diver continues in positioning himself to begin the welding task. When ready to begin welding, the trigger on the torch is depressed momentarily by the diver, thereby reversing the position of the roller assembly, moving it forward, and extending the filler wire to its original position prior to retraction without engaging the roller assembly wire feed advancement motor. Any additional pressing of the trigger advances the filler wire through the rollers in a manner consistent with that of ordinary terrestrial torches, resulting in no advancing or retracting movements of the roller assembly on the linear slide during the action. Whenever the roller assembly retracts, the filler wire supply on the reel becomes loose, the slack of which action is compensated for and taken up by the reverse rotary force of the tensioner acting on the reel which maintains constant pressure on it regardless of the position of the reel or roller assembly. This force is overcome by the advancement of the filler wire through the rollers in normal welding operations or by the advancement of the roller assembly on the linear slide when the torch trigger is depressed momentarily. The air regulator used in the present invention is adjusted and preset for the overpressure desired while the enclosure is at atmospheric pressure levels prior to immersion to maintain a specific internal pressure relevant to changing ambient pressures, and is easily adjusted using an adjustment knob. The pressure regulator shown can be replaced by a commercially available miniaturized differential air or gas pressure regulator used in process industries and which is available in appropriate low or high pressure ranges, depending upon the ambient pressures to be operated in.

When the welding force feedback wire feed system is used with an underwater ROV or terrestrial robotic vehicle or robotic arm, the operation of the torch and enclosure is remotely controlled and, alternatively, the adjustable relay is remotely relocated to an operating console which is not submerged and may communicate with the enclosure components via fiberoptics or conventional signal transmission wires or cables. In this application, the trigger on the torch is disconnected and the wire feed task is remotely controlled from a remotely located console using signal transmission wires as shown. The robotic arm used may be of any type commonly used in underwater operations.

It should be understood that while the particular embodiments of the invention specifically discussed above are preferable, modifications thereto may be made without departing from the scope of the invention. For example, the enclosure of the present invention may enclose such other elements necessary to other types of welding such as laser emitters for laser welding, microwave emitters for microwave or microwave enhanced welding, capacitors and other types of storage and generating devices for homopolar welding, and thermal spray or plasma welding powder storage devices.

While this invention has been described fully and completely with special emphasis upon preferred embodiments, it should be understood that within the scope of the appended claims the invention may be practiced otherwise than as specifically described herein.

I claim:

1. A welding force feedback wire feed system for wire fed welding torches, comprising:

a sealed enclosure having side walls;

a reel in said enclosure having a length of welding filler wire wound thereon;

wire seal means on a side wall of said enclosure through which a free end of said filler wire sealingly passes to the exterior of said enclosure;

a wire fed welding torch remote from said enclosure through which said filler wire free end passes and having transducer means thereon for sensing deflective and deformative pressure forces acting on said filler wire upon sufficient contact of said free end with a solid surface and transmitting a feedback signal responsive thereto;

a set of rotatable drive rollers through which said free end of said filler wire passes extendibly and retractably mounted between said reel and said remote torch, said rollers operatively connected with an electrical power source to wind said filler wire off of said reel and feed it through said wire seal means and said torch upon rotation;

roller actuator means connected with said set of rollers for extending and retracting said rollers and said filler wire passing therethrough; and signal receiving and amplifying means in said enclosure connected with said transducer means and with said roller actuator means; wherein upon said filler wire free end contacting a solid surface with sufficient force to cause deflection or deformation thereof, said transducer means transmits a feedback signal to said signal receiving and amplifying means which sends an actuating signal to said roller actuator means causing it to retract said set of rollers and said filler wire responsive to said feedback signal to prevent said filler wire from bending.

2. The welding force feedback wire feed system according to claim 1, wherein said set of rollers are extendibly and retractably mounted in said enclosure.

3. The welding force feedback wire feed system according to claim 1, wherein said set of rollers are extendibly and retractably mounted on said remote torch.

4. A welding force feedback wire feed system according to claim 1, further comprising means in said enclosure operatively connected with said filler wire for conducting DC welding current therethrough.

5. A welding force feedback wire feed system according to claim 1, further comprising:

tensioning means operatively connected with said reel to prevent said filler wire from freely spooling off said reel and to maintain constant tension on said filler wire as it is wound onto and off of said reel during a welding operation.

6. A welding force feedback wire feed system according to claim 1, further comprising a waterproof and electrically insulated DC input cable extending sealably through a side wall of said enclosure connected at an outer end to a remote DC electrical power source and connected with said filler wire at an inner end for conducting DC welding current through said filler wire.

7. A welding force feedback wire feed system according to claim 1, further comprising:

a high frequency multiplexer unit in said enclosure connected with a remote source of AC electrical current through a waterproof and electrically insulated AC input cable extending sealably through a side wall of said enclosure and connected with a remote source of DC welding current through a DC input cable extending sealably through a side wall of said enclosure;

said multiplexer unit operatively connected with said filler wire through a high frequency cable and operative to multiplex a high frequency signal onto the DC power signal and send the composite signal to said filler wire.

8. A welding force feedback wire feed system according to claim 1, further comprising:

an inverter connected with a remote source of AC electrical current through a waterproof and electrically insulated AC input cable extending sealably through a side wall of said enclosure for converting input AC current to DC current; and a high frequency multiplexer unit in said enclosure connected with said inverter;

said multiplexer unit operatively connected with said filler wire through a high frequency cable and operative to multiplex a high frequency signal onto the DC power signal and send the composite signal to said filler wire.

9. A welding force feedback wire feed system according to claim 1, further comprising:

a step-down transformer connected with a remote source of AC electrical curent through a waterproof and electrically insulated AC input cable extending sealably through a side wall of said enclosure;

an inverter connected with said transformer for converting input AC current to DC current; and a high frequency multiplexer unit in said enclosure connected with said transformer and said inverter;

said multiplexer unit operatively connected with said filler wire through a high frequency cable and operative to multiplex a high frequency signal onto the DC power signal and send the composite signal to said filler wire.

10. The welding force feedback wire feed system according to claim 9, further comprising a ground fault interrupt circuit breaker installed at a remote location and connected with said AC input cable.

11. A welding force feedback wire feed system according to claim 1, further comprising cooling and heat dissipating means in said enclosure to dissipate heat and facilitate cooling of the interior of said enclosure.

12. A welding force feedback wire feed system according to claim 1, wherein said wire seal means is an electrically insulated telescoping tubular sleeve assembly having a first tubular member secured at one end to said set of rollers and a second tubular member slidably engaged therewith secured at one end to said enclosure.

13. A welding force feedback wire feed system according to claim 1, further comprising:
   a hollow electrode lead connected with said enclosure and said torch and having a central bore through which said filler wire passes and through which a shielding gas passes;
   a flow meter in said enclosure joined in fluid communication with said central bore; and
   a shielding gas conduit joined at an inner end in fluid communication with said flow meter extending sealably through a side wall of said enclosure and connected at an outer end to a remote source of shielding gas for conducting said shielding gas through said electrode lead to said torch.

14. A welding force feedback wire feed system according to claim 1, further comprising:
   an air pressure regulator on said enclosure connected to a remote source of pressurized air and having an air delivery orifice penetrating a side wall of said enclosure wall, said regulator operative to sense increased water pressure and introduce a volume of air into the interior of said enclosure in response to increasing outside pressure and maintain a preset pressure within said enclosure with respect to outside pressure, and
   an overpressure relief valve on said enclosure to maintain suitable overpressure as said enclosure is operated at predetermined water depths and to vent it as it encounters reduced sea pressure in returning to the water surface.

15. A welding force feedback wire feed system according to claim 1, further comprising:
   an analog to digital converter in said enclosure connected to a remote station by a signal transmission cable for providing control and sensing signals between said enclosure and said remote station to monitor, control and operate components of said system.

16. A welding force feedback wire feed system according to claim 1, wherein
   said roller actuator means is hydraulically operated.

17. A welding force feedback wire feed system according to claim 1, further comprising
   an inverted cup-shaped torch enclosure surrounding a tip end of said remote welding torch; and
   a shielding gas conduit joined at one end in fluid communication with the interior of said torch enclosure and connected at another end to a remote source of pressurized shielding gas for conducting said shielding gas into the interior of said torch enclosure to surround said torch tip end.

18. A method for preventing bending of a weld filling wire during welding operations utilizing wire fed welding torches, comprising the steps of:
   providing a sealed enclosure containing a supply of filler wire wound on a reel with a free end of the filler wire extending sealably through the enclosure and through a remote wire fed welding torch;
   providing a set of rotatable drive rollers between said reel and said remote torch through which said free end of said filler wire passes, said rollers operatively connected with an electrical power source to wind said filler wire off of said reel and feed it through said wire seal means and said torch upon rotation;
   providing an extendible and retractable mounting for said drive rollers and actuator means connected therewith controlled by signal receiving means to extend and retract said drive rollers;
   providing transducer means on said remote wire fed welding torch conected with said signal receiving means for sensing deflective and deformative pressure forces acting on said filler wire upon sufficient contact of said free end with a solid surface;
   moving said drive rollers to a normally extended position to place said filler wire free end in a normal welding position relative to the tip end of said remote torch;
   rotating said drive rollers to feed said filler wire free end to said torch during the welding operation; whereby
   upon said filler wire free end contacting a solid surface with sufficient force to cause deflection or deformation thereof, said transducer means transmits a feedback signal to said signal receiving means which sends an actuating signal to said roller actuator causing it to retract said set of drive rollers and said filler wire responsive to said signal to prevent said filler wire from bending.

19. The method according to claim 18, comprising the further step of
   providing a source of DC welding current in said enclosure connected with said filler wire for conducting DC welding current therethrough.

* * * * *